(12) United States Patent
Vivanco

(10) Patent No.: US 9,301,200 B1
(45) Date of Patent: Mar. 29, 2016

(54) MANAGING DEPLOYMENT OF A RADIO ACCESS TECHNOLOGY

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 92 days.

(21) Appl. No.: 14/226,039

(22) Filed: Mar. 26, 2014

(51) Int. Cl.
*G06Q 10/06* (2012.01)
*H04W 28/08* (2009.01)

(52) U.S. Cl.
CPC .................... *H04W 28/08* (2013.01)

(58) Field of Classification Search
CPC ..... H04W 24/02; H04W 24/08; H04W 24/00; H04W 28/08; H04W 24/10; H04L 12/6418; H04L 12/66
USPC ......................... 370/252, 241, 230
See application file for complete search history.

(56) References Cited

U.S. PATENT DOCUMENTS 8,861,494 B2 * 10/2014 Mukhopadhyay ............ 370/338
2005/0015623 A1 * 1/2005 Williams et al. ............. 713/201

* cited by examiner

*Primary Examiner* — Luat Phung
*Assistant Examiner* — Thomas R Cairns

(57) ABSTRACT

An access node load distribution of a first radio access technology at a first time is received from a plurality of access nodes, the first time comprising a first deployment time of a second radio access technology to at least one of the plurality of access nodes. A baseline access node load distribution of the first radio access technology at a time before deployment of the second radio access technology to any of the plurality of access nodes is determined. A cross-correlation is calculated of the access node load distribution and the baseline access node load distribution. When a difference between the cross-correlation and the baseline access node load distribution is greater than or equal to a difference threshold, an access node load distribution of the second radio access technology is determined based on a combination of the access node load distribution of the first and second radio access technologies.

16 Claims, 5 Drawing Sheets

MANAGING DEPLOYMENT OF A RADIO ACCESS TECHNOLOGY

TECHNICAL BACKGROUND

Deployment of a new radio access technology in a communication network provides numerous benefits, and poses numerous challenges, for a network operator. The new radio access technology may, for example, additional resources to subscribers, greater network coverage, faster communication speeds, and the like. However, the new radio access technology may affect usage of the network. Further, the new radio access technology is typically not deployed simultaneously throughout the communication network, but rather is deployed gradually into the network. It is vital that the network operator accurately determine network capacity and resource utilization over time as the new radio access technology is deployed.

OVERVIEW

In operation, a baseline access node load distribution of a first radio access technology is determined for a time before deployment of a second radio access technology to any of a plurality of access nodes. Then, an access node load distribution of the first radio access technology at a first time is received from a plurality of access nodes. The first time can comprise a first deployment time of the second radio access technology to at least one of the plurality of access nodes. A cross-correlation is calculated of the access node load distribution at the first time and the baseline access node load distribution. Then, a difference is calculated between the cross-correlation of the access node load distribution at the first time and the baseline access node load distribution, and the baseline access node load distribution. When the difference is greater than or equal to a difference threshold, an access node load distribution of the second radio access technology is determined based on a combination of the access node load distribution of the first radio access technology and the access node load distribution of the second radio access technology.

DETAILED DESCRIPTION

Figure 1:
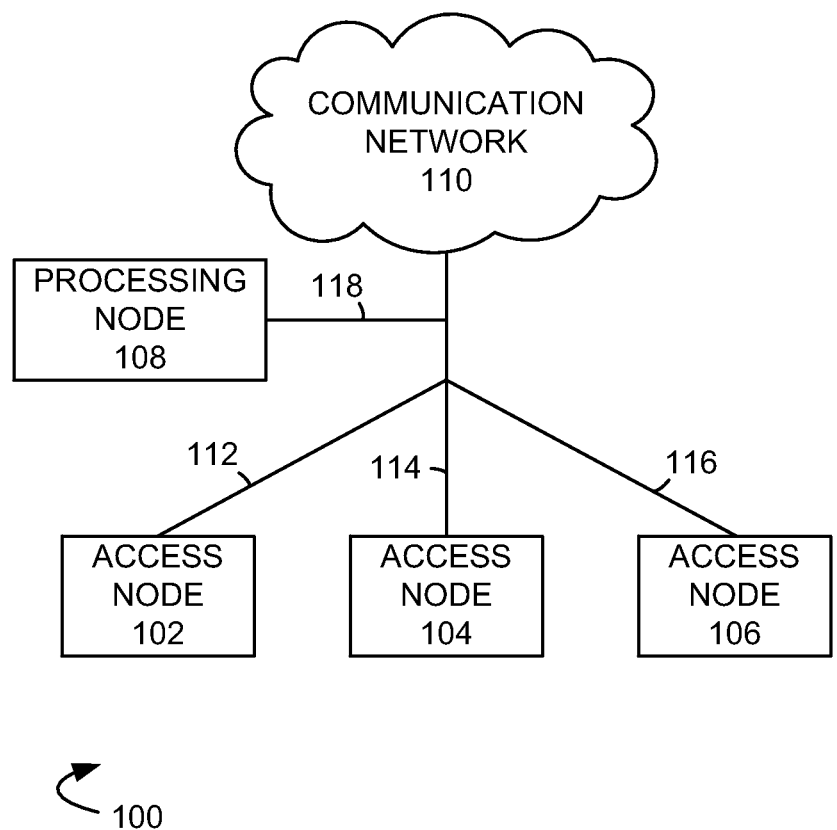
FIG. 1 illustrates an exemplary communication system for managing deployment of a radio access technology.

FIG. 1 illustrates an exemplary communication system 100 for managing deployment of a radio access technology comprising access nodes 102, 104, and 106, and processing node 108, and communication network 110.

Access nodes 102, 104 and 106 are each is a network node capable of providing wireless communications to a wireless device (not illustrated), for example, a cell phone, a smart phone, a computing platform such as a laptop, palmtop, or tablet, a personal digital assistant, or an internet access device, including combinations thereof. Access nodes 102, 104 and 106 can comprise, for example, a base transceiver station, a radio base station, an eNodeB device, or an enhanced eNodeB device. Access nodes 102, 104 and 106 can comprise a larger access node, such as a macro node, or they can comprise a smaller access node, such as a micro node, a pico node, a femto node, and the like. Varying size access nodes can be characterized by available transmission power, frequency bands supported, coverage areas of the frequency bands, and number of simultaneous connections supported, among other things. A first access node (e.g., access node 102) can comprise a first coverage area, and a second access node (e.g., access node 104) can comprise a second coverage area, at least a portion of which overlaps the first coverage area. Access node 102 is in communication with communication network 110 over communication link 112, access node 104 is in communication with communication network 110 over communication link 114, and access node 106 is in communication with communication network 110 over communication link 116. Each of access nodes 102, 104, and 106 can be configured to provide wireless communications using a first radio access technology and a second radio access technology. In operation, each of access nodes 102, 104, and 106 can be configured to provide wireless communications using the first radio access technology, and subsequently the second radio access technology can be deployed to one or more of access nodes 102, 104, and 106 (i.e., each of access nodes 102, 104, and 106 can subsequently be configured to also provide wireless communications using the second radio access technology).

Processing node 108 can comprise a processor and associated circuitry to execute or direct the execution of computer-readable instructions, and can be configured to manage deployment of a radio access technology. Processing node 108 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 108 can receive instructions and other input at a user interface. Examples of processing node 108 can comprise a mobile switching center (MSC), a dispatch call controller (DCC), a mobility management entity (MME), an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, a network gateway, and another similar network node, including combinations thereof. Processing node 108 is in communication with access nodes 102, 104 and 106 and with communication network 110 over communication link 118.

Communication network 110 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device in communication with access nodes 102, 104, or 106. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, and 118 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 102, 104, and 106, processing node 108, and communication network 110 which are omitted for clarity, including additional processing nodes, routers, gateways, and physical and/or wireless data links for carrying data among the various network elements.

Network operators desire to provide faster and more reliable communication services to subscriber, and may deploy newer radio access technologies to improve available services. It is vital that a network operator accurately determine network capacity and resource utilization over time of radio access technologies used in the communication network as newer radio access technology is deployed. Capacity determination and forecasting requires numerous inputs, including resource utilization, demand forecasting, load distribution, network deployment and topology, and so forth. Newer technologies (such as radio access technologies) are typically not deployed simultaneously throughout a communication network, but rather are deployed gradually. The uneven deployment of newer technologies affects the usage of network resources. Further, uneven deployment of newer technologies gives rise to a distorted view of network resource utilization for both the older and the newer technologies during the deployment of the newer technology. For example, as a newer radio access technology is deployed to access nodes in a communication network, the proportion of use of the older radio technologies at different areas of the communication network may change unevenly, and a determination of the overall usage of the older radio technologies in the network can be distorted. Additionally, subscriber use, and thus network utilization, of the newer radio access technology may be different than subscriber use of the older radio access technology. For example, utilization of applications with greater application requirements (e.g., minimum data rate, higher QoS, and the like) may increase with the deployment of the new radio access technology. These changes can affect resource planning and demand forecasting for the newer radio access technology, in particular if such resource planning and demand forecasting is based on the determined utilization of the older radio access technology.

In operation, a baseline access node load distribution is determined of a first radio access technology at a time before deployment of a second radio access technology to any of the plurality of access nodes 102, 104, and 106. Then, an access node load distribution of the first radio access technology at a first time is received from the plurality of access nodes 102, 104, and 106, wherein the first time comprises a first deployment time of the second radio access technology to at least one of the plurality of access nodes. For example, the first radio access technology can comprise a so-called 3G radio access technology (e.g., GSM, CDMA, etc.), and the second radio access technology can comprise a so-called 4G radio access technology (e.g., WiMAX, LTE, etc.). It will be appreciated that the examples of so-called 3G and 4G radio access technologies are non-limiting. The access node load distribution of the first radio access technology at the first time can be received, e.g., at processing node 108. Then, a cross-correlation of the access node load distribution at the first time and the baseline access node load distribution is calculated. Next, a difference is calculated between the cross-correlation of the access node load distribution at the first time and the baseline access node load distribution, and the baseline access node load distribution. When the difference is greater than or equal to a difference threshold, based on a combination of the access node load distribution of the first radio access technology and the access node load distribution of the second radio access technology, an access node load distribution of the second radio access technology is determined.

Figure 2:
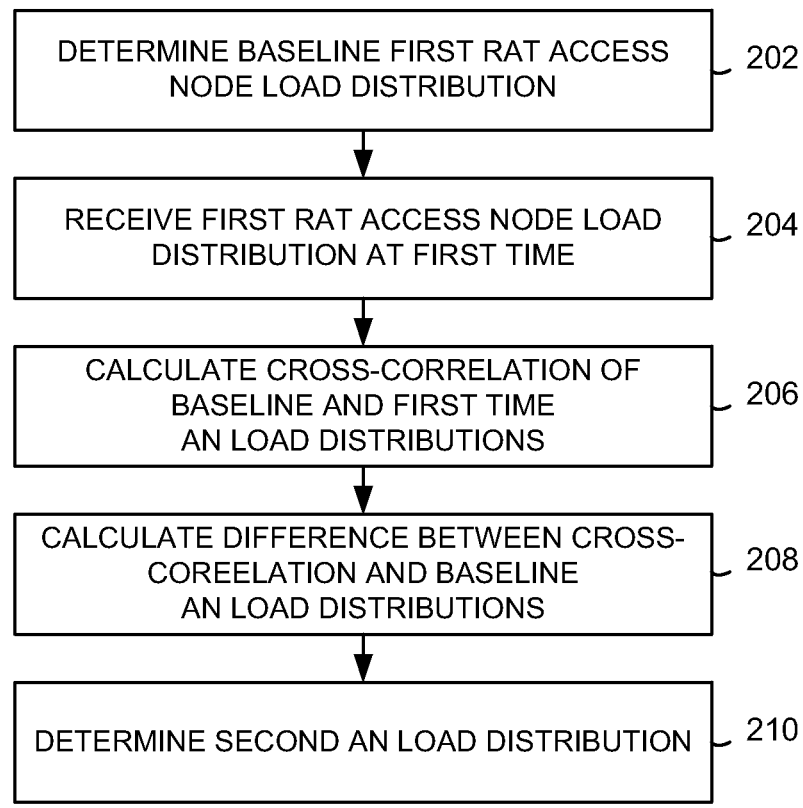
FIG. 2 illustrates an exemplary method of managing deployment of a radio access technology.

FIG. 2 illustrates an exemplary method of managing deployment of a radio access technology (RAT). In operation 202, a baseline access node load distribution is determined of a first radio access technology at a time before deployment of a second radio access technology to any of a plurality of access nodes. The baseline load distribution can be determined based on first radio access technology usage information received from each of access nodes 102, 104, and 106. For example, access nodes 102, 104, and 106 can be configured to provide wireless communications using a first radio access technology. The baseline load distribution can comprise a proportion of a load of network resource utilization which is used at each of access nodes 102, 104, and 106. The network resource utilization can comprise a utilization or requested utilization of communication link resources, an amount of data sent to or from an access node, a number of physical resource blocks or other wireless communication link resource utilized at each access node, a requested amount of data to be sent to or from each access node (as may be determined from an uplink resource request, downlink resource request, or similar request for wireless communication link resources), an amount of data buffered for transmission to or from each access node, and the like, including combinations thereof. The baseline load distribution can be expressed as percentages of load at each access node, a proportion of overall load at each access node, and the like.

Then, an access node load distribution of a first radio access technology at a first time is received, wherein the first time comprises a first deployment time of a second radio access technology to at least one of the plurality of access nodes (operation 204). The second radio access technology is typically deployed gradually to access nodes in the communication system, for example, first to access node 102, then to access node 104, and then to access node 106. It will be appreciated that a communication system will typically include a greater number of access nodes, and that the second radio access technology may be deployed to groups of access nodes, or to an individual access nodes, at a given time. The access node load distribution of the first radio access technology at a first time can comprise a proportion of a load of network resource utilization which is used at each of access nodes 102, 104, and 106 at the first time. The access node load distribution can be expressed as percentages of load at each access node, a proportion of overall load at each access node, and the like.

Next, a cross-correlation is calculated of the access node load distribution at the first time and the baseline access node load distribution (operation 206). As the second radio access technology is deployed (i.e., as each access node is configured to provide communications using the second radio access technology), the access node load distribution of the first radio access technology may change. Further, because usage of the second radio access technology (i.e., communication resource utilization, network element utilization, etc.) may be different than usage of the first radio access technology, the change in access node load distribution of the first radio access technology may not be linearly related to deployment of the second radio access technology. The cross-correlation of the baseline access node load distribution and the access node load distribution at the first time and provides an indication of a comparison of the access node load distribution at the first time from the baseline access node load distribution.

A difference is then calculated between the cross-correlation of the access node load distribution at the first time and the baseline access node load distribution, and the baseline access node load distribution (operation 208). The calculated difference can provide an indication of a degree of difference between the baseline access node load distribution (i.e., before the second radio access technology is deployed to any access node) and the access node load distribution at the first time (of second radio access technology deployment).

When the difference is greater than or equal to a difference threshold, an access node load distribution of the second radio access technology is determined based on a combination of the access node load distribution of the first radio access technology and the access node load distribution of the second radio access technology (operation 210). As the second radio access technology is deployed, the load distribution of the first radio access technology tends to decrease, and further, the usage of the second radio access technology may be different than the usage of the first radio access technology. For example, utilization of applications with greater application requirements (e.g., minimum data rate, higher QoS, and the like) may increase with the deployment of the second radio access technology. Reliance on the access node load distribution of the first radio access technology to determine current and/or future usage of the second radio access technology becomes increasingly unreliable over time. Thus, when the difference is greater than or equal to a difference threshold, an access node load distribution of the second radio access technology is determined based on a combination of the access node load distribution of the first radio access technology and the access node load distribution of the second radio access technology.

Figure 3:
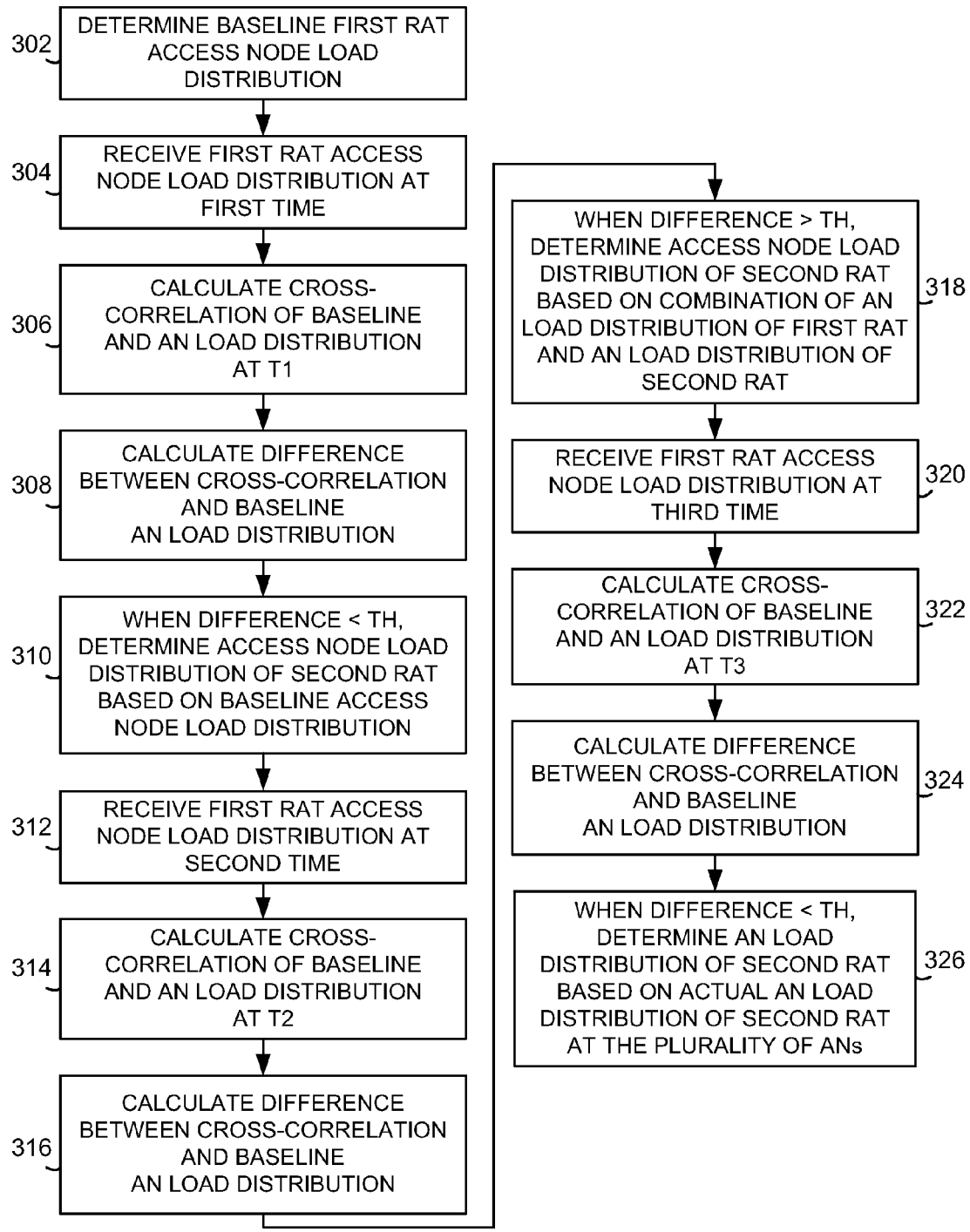
FIG. 3 illustrates another exemplary method of managing deployment of a radio access technology.
Figure 4:
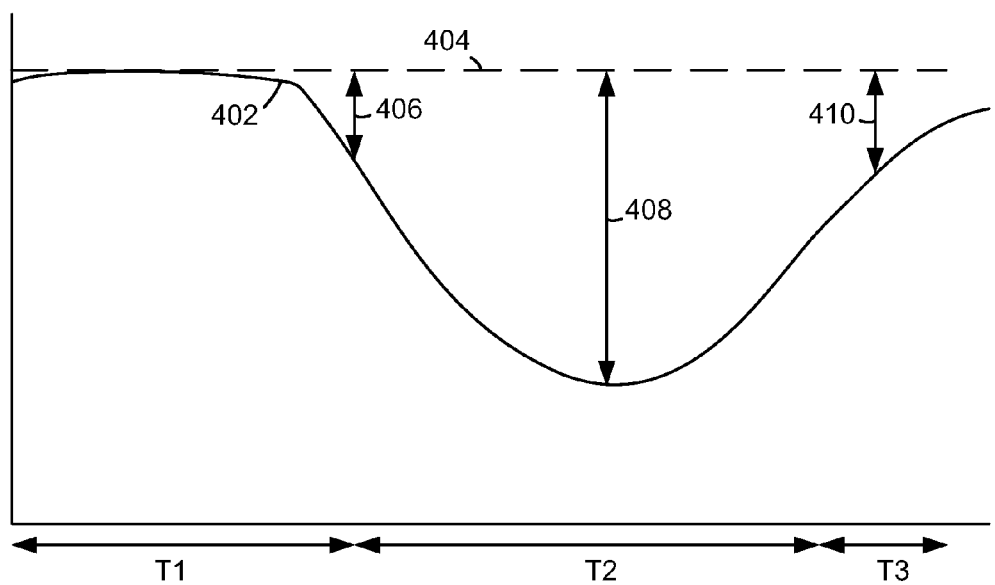
FIG. 4 illustrates an exemplary baseline access node load distribution and a cross-correlation of an access node load distribution of a first radio access technology and the baseline access node load distribution over time.

FIG. 3 illustrates another exemplary method of managing deployment of a radio access technology (RAT). In operation 302, a baseline access node load distribution is determined of a first radio access technology at a time before deployment of a second radio access technology to any of a plurality of access nodes. The baseline load distribution can be determined based on first radio access technology usage information received from each of a plurality of access nodes (e.g., access nodes 102, 104, and 106, FIG. 1). As an example, FIG. 4 illustrates an exemplary baseline access node load distribution 404 and cross-correlation of a first radio access technology the baseline access node load distribution over time 402. Baseline load distribution 404 can comprise a proportion of a load of network resource utilization which is used at each of a plurality of access nodes at a time prior to the deployment of the second radio access technology at any of the plurality of access nodes. The network resource utilization can comprise a utilization or requested utilization of communication link resources, an amount of data sent to or from an access node, a number of physical resource blocks or other wireless communication link resource utilized at each access node, a requested amount of data to be sent to or from each access node (as may be determined from an uplink resource request, downlink resource request, or similar request for wireless communication link resources), an amount of data buffered for transmission to or from each access node, and the like, including combinations thereof. The baseline load distribution can be expressed as percentages of load at each access node, a proportion of overall load at each access node, and the like.

Referring again to FIG. 3, an access node load distribution of a first radio access technology at a first time is received, wherein the first time comprises a first deployment time of a second radio access technology to at least one of the plurality of access nodes (operation 304). As an example, access node load distribution 402 (FIG. 4) represents the access node load distribution of the first radio access technology over the plurality of access nodes over time. The first time can comprise a discrete time, a period of time (e.g., period T1), and the like. The access node load distribution of the first radio access technology at the first time can comprise a proportion of a load of network resource utilization which is used at each of a plurality of access nodes at the first time. The access node load distribution can be expressed as percentages of load at each access node, a proportion of overall load at each access node, and the like.

Returning to FIG. 3, a cross-correlation is calculated of the access node load distribution at the first time and the baseline access node load distribution (operation 308). As the second radio access technology is deployed (i.e., as each access node is configured to provide communications using the second radio access technology), the access node load distribution of the first radio access technology may change. Further, because usage of the second radio access technology (i.e., communication resource utilization, network element utilization, etc.) may be different than usage of the first radio access technology, the change in access node load distribution of the first radio access technology may not be linearly related to deployment of the second radio access technology. The cross-correlation of the baseline access node load distribution and the access node load distribution at the first time provides an indication of a comparison of the access node load distribution at the first time from the baseline access node load distribution. The cross-correlation of the access node load distribution at the first time and the baseline access node load distribution at the first time can be illustrated as cross-correlation 402 during time T1 (FIG. 4).

A difference is then calculated between the cross-correlation of the access node load distribution at the first time and the baseline access node load distribution, and the baseline access node load distribution (operation 308, FIG. 3). For example, difference 406 can be calculated between the baseline access node load distribution 404 and the cross-correlation of the access node load distribution 402 at the first time T1. The calculated difference can provide an indication of a degree of difference between the baseline access node load distribution (i.e., before the second radio access technology is deployed to any access node) and the access node load distribution at the first time (of second radio access technology deployment).

Returning to FIG. 3, when the difference is less than a difference threshold at the first time, the access node load distribution of the second radio access technology can be determined based on the baseline access node load distribution (operation 310). For example, during the first time (or at the first time), the second radio access technology may have been deployed to relatively few access nodes. The load associated with the first radio access technology at these access nodes may be reduced, changing the overall access node load distribution of the first radio access technology, but because relatively few access nodes have been configured to use the second radio access technology, determining the access load distribution of the second radio access technology based on the baseline access node load distribution can still provide a reasonably accurate assessment of network resource utilization on which to base deployment of the second radio access technology.

Next, an access node load distribution of a first radio access technology at a second time is received, wherein the second time comprises a second deployment time of the second radio access technology to at least one of the plurality of access nodes (operation 312). The second time can comprise a discrete time, a period of time (e.g., period T2, FIG. 4), and the like. The access node load distribution of the first radio access technology at the second time can comprise a proportion of a load of network resource utilization which is used at each of a plurality of access nodes at the second time. The access node load distribution can be expressed as percentages of load at each access node, a proportion of overall load at each access node, and the like.

Returning to FIG. 3, a cross-correlation is calculated of the access node load distribution at the second time and the baseline access node load distribution (operation 308). The cross-correlation of the baseline access node load distribution and the access node load distribution at the first time and provides an indication of a comparison of the access node load distribution at the first time from the baseline access node load distribution. The cross-correlation of the access node load distribution at the first time and the baseline access node load distribution at the first time can be illustrated as cross-correlation 402 during time T2 (FIG. 4).

A difference is then calculated between the cross-correlation of the access node load distribution at the first time and the baseline access node load distribution, and the baseline access node load distribution (operation 316, FIG. 3). For example, difference 408 can be calculated between the baseline access node load distribution 404 and the cross-correlation of the access node load distribution 402 at the second time T2. The calculated difference can provide an indication of a degree of difference between the baseline access node load distribution (i.e., before the second radio access technology is deployed to any access node) and the access node load distribution at the second time of second radio access technology deployment.

Returning to FIG. 3, when the difference is greater than or equal to a difference threshold at the second time, the access node load distribution of the second radio access technology can be determined based on based on a combination of the access node load distribution of the first radio access technology and the access node load distribution of the second radio access technology (operation 318).

In an example, determining an access node load distribution of the second radio access technology based on a combination of the access node load distribution of the first radio access technology and the access node load distribution of the second radio access technology can further comprise calculating a total load of the plurality of access nodes using the first radio access technology based on the received access node load distribution of the first radio access technology at the plurality of access nodes. Then, a first proportion can be calculated of the total load of the plurality of access nodes using the first radio access technology at each of the plurality of access nodes where the second radio access technology is deployed. Next, a second proportion can be calculated of the total load of the plurality of access nodes using the first radio access technology at each of the plurality of access nodes where the second radio access technology is not deployed. Then, based on the first proportion and an access node load distribution of the second radio access technology at each of the plurality of access nodes where the second radio access technology is deployed, a first access node load distribution can be determined of the second radio access technology at the plurality of access nodes where the second radio access technology is deployed. Subsequently, based on the second proportion and an access node load distribution of the first radio access technology at the plurality of access nodes where the second radio access technology is not deployed, a second access node load distribution can be determined of the second radio access technology at the plurality of access nodes where the second radio access technology is not deployed.

For example, a total load of the plurality of access nodes using the first radio access technology can be calculated based on the received access node load distribution of the first radio access technology at the plurality of access nodes. Then, a first percentage of the total load of the plurality of access nodes using the first radio access technology at each of the plurality of access nodes where the second radio access technology is deployed can be represented as $\alpha$. When the second radio access technology has not been deployed to any access nodes, $\alpha=0\%$, and when the second radio access technology has been deployed to all access nodes, $\alpha=100\%$. A second percentage can then be calculated of the total load of the plurality of access nodes using the first radio access technology at each of the plurality of access nodes where the second radio access technology is not deployed, which can be represented as $1-\alpha$. A first access node load distribution of the first radio access technology can be determined at the plurality of access nodes where the second radio access technology is deployed based on the first proportion and an access node load distribution of the second radio access technology at each of the plurality of access nodes where the second radio access technology is deployed. For example, a can be distributed among access nodes where the second radio access technology has been deployed, based on the corresponding access node load distribution of the second radio access technology at those access nodes. Then, a second access node load distribution can be determined of the first radio access technology at the plurality of access nodes where the second radio access technology is not deployed based on the second proportion and an access node load distribution of the first radio access technology at the plurality of access nodes where the second radio access technology is not deployed. For example, $1-\alpha$ can be distributed among the access nodes where the second radio access technology has not been deployed, based on the corresponding access node load distribution of the first radio access technology at those access nodes.

Referring again to FIG. 3, an access node load distribution of a first radio access technology at a third time is received, wherein the third time comprises a third deployment time of a second radio access technology to at least one of the plurality of access nodes (operation 320). As an example, access node load distribution 402 (FIG. 4) represents the access node load distribution of the first radio access technology over the plurality of access nodes over time. The third time can comprise a discrete time, a period of time (e.g., period T3), and the like. The access node load distribution of the first radio access technology at the third time can comprise a proportion of a load of network resource utilization which is used at each of a plurality of access nodes at the third time. The access node load distribution can be expressed as percentages of load at each access node, a proportion of overall load at each access node, and the like.

Returning to FIG. 3, a cross-correlation is calculated of the access node load distribution at the third time and the baseline access node load distribution (operation 322). The cross-correlation of the baseline access node load distribution and the access node load distribution at the third time and provides an indication of a comparison of the access node load distribution at the third time from the baseline access node load distribution. The cross-correlation of the access node load distribution at the third time and the baseline access node load distribution at the first time can be illustrated as cross-correlation 402 during time T3 (FIG. 4).

A difference is then calculated between the cross-correlation of the access node load distribution at the third time and the baseline access node load distribution, and the baseline access node load distribution (operation 324, FIG. 3). For example, difference 410 can be calculated between the baseline access node load distribution 404 and the cross-correlation of the access node load distribution 402 at the third time T3. The calculated difference can provide an indication of a degree of difference between the baseline access node load distribution (i.e., before the second radio access technology is deployed to any access node) and the access node load distribution at the third time of second radio access technology deployment.

Returning to FIG. 3, when the difference is less than a difference threshold at the third time, the access node load distribution of the second radio access technology can be determined based on the access node load distribution of the second radio access technology at the plurality of access nodes at the third time (operation 326). For example, during the third time (or at the third time), the second radio access technology may have been deployed to a relatively large proportion of the plurality of access nodes. Because relatively many access nodes have been configured to use the second radio access technology, determining the access load distribution of the second radio access technology can now provide a reasonably accurate assessment of network resource utilization on which to base deployment of the second radio access technology.

Figure 5:
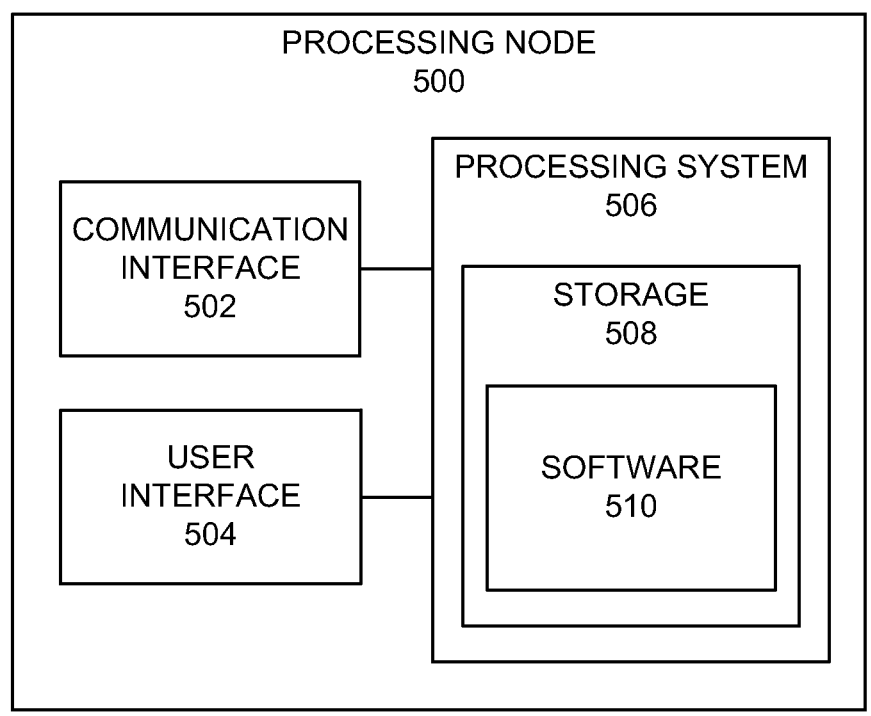
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a neighbor access node of an access node in a communication system. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 102, 104, and 106, and processing node 108. Processing node 500 can also be an adjunct or component of one or more of the foregoing network elements. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing deployment of a radio access technology, comprising:

determining a baseline access node load distribution of a first radio access technology at a time before deployment of a second radio access technology to any of a plurality of access nodes;

receiving from the plurality of access nodes an access node load distribution of a first radio access technology at a first time, wherein the first time comprises a first deployment time of a second radio access technology to at least one of the plurality of access nodes;

wherein the access node load distribution of the first radio access technology at the first time is based on:

calculating a total load of the plurality of access nodes using the first radio access technology; and determining a proportion of the total load of the plurality of access nodes using the first radio access technology at each of the plurality of access nodes;

determining a degree of difference between the baseline access node load distribution of the first radio access technology and the access node load distribution of the first radio access technology at the first time; and when the degree of difference is greater than or equal to a difference threshold, determining an access node load distribution of the second radio access technology based on a combination of a first access node load distribution of the first radio access technology at each of the plurality of access nodes where the second radio access technology is deployed, and a second access node load distribution of the first radio access technology at each of the plurality of access nodes where the second radio access technology is not deployed.

2. The method of claim 1, further comprising receiving from the plurality of access nodes an access node load distribution of the first radio access technology at the plurality of access nodes at a second time prior to the first time, wherein the second time comprises a second deployment time of the second radio access technology to at least one of the plurality of access nodes.

3. The method of claim 2, further comprising determining a degree of difference between the access node load distribution at the second time and the baseline access node load distribution.

4. The method of claim 3, further comprising determining the access node load distribution of the second radio access technology based on the baseline access node load distribution when the degree of difference is less than the difference threshold at the first deployment time.

5. The method of claim 1, further comprising receiving from the plurality of access nodes an access node load distribution of the first radio access technology at the plurality of access nodes at a third time after the first deployment time, wherein the third time comprises a third deployment time of the second radio access technology to at least one of the plurality of access nodes.

6. The method of claim 5, further comprising determining a degree of difference between the access node load distribution at the third time and the baseline access node load distribution.

7. The method of claim 6, further comprising determining an access node load distribution of the second radio access technology based on the access node load distribution of the first radio access technology at the plurality of access nodes at the third time when the degree of difference is less than the difference threshold at the third deployment time.

8. The method of claim 1, wherein determining an access node load distribution of the second radio access technology based on a combination of the first access node load distribution of the first radio access technology at each of the plurality of access nodes where the second radio access technology is deployed and the second access node load distribution of the first radio access technology at each of the plurality of access nodes where the second radio access technology is not deployed further comprises:

calculating a total load of the plurality of access nodes using the first radio access technology based on the received access node load distribution of the first radio access technology at the plurality of access nodes;

calculating a first proportion of the total load of the plurality of access nodes using the first radio access technology at each of the plurality of access nodes where the second radio access technology is deployed;

calculating a second proportion of the total load of the plurality of access nodes using the first radio access technology at each of the plurality of access nodes where the second radio access technology is not deployed;

determining the first access node load distribution of the first radio access technology at the plurality of access nodes where the second radio access technology is deployed based on the first proportion and an access node load distribution of the second radio access technology at each of the plurality of access nodes where the second radio access technology is deployed; and determining the second access node load distribution of the first radio access technology at the plurality of access nodes where the second radio access technology is not deployed based on the second proportion and an access node load distribution of the first radio access technology at the plurality of access nodes where the second radio access technology is not deployed.

9. A system of managing deployment of a radio access technology, comprising:

a processing node comprising a processor and associated circuitry to execute or direct the execution of computer-readable instructions, wherein the processing node is configured to determine baseline access node load distribution of a first radio access technology at a time before deployment of a second radio access technology to any of a plurality of access nodes;

receive from the plurality of access nodes an access node load distribution of a first radio access technology at a first time, wherein the first time comprises a first deployment time of a second radio access technology to at least one of the plurality of access nodes;

wherein the processing node is further configured to:

calculate a total load of the plurality of access nodes using the first radio access technology; and determine a proportion of the total load of the plurality of access nodes using the first radio access technology at each of the plurality of access nodes;

determine a degree of difference between the baseline access node load distribution of the first radio access technology and the access node load distribution of the first radio access technology at the first time; and when the degree of difference is greater than or equal to a difference threshold, determine an access node load distribution of the second radio access technology based on a combination of a first access node load distribution of the first radio access technology at each of the plurality of access nodes where the second radio access technology is deployed, and a second access node load distribution of the first radio access technology at each of the plurality of access nodes where the second radio access technology is not deployed.

10. The system of claim 9, wherein the processing node is further configured to receive from the plurality of access nodes an access node load distribution of the first radio access technology at the plurality of access nodes at a second time prior to the first time, wherein the second time comprises a second deployment time of the second radio access technology to at least one of the plurality of access nodes.

11. The system of claim 10, wherein the processing node is further configured to determine a degree of difference between the access node load distribution at the second time and the baseline access node load distribution.

12. The system of claim 11, wherein the processing node is further configured to determine the access node load distribution of the second radio access technology based on the baseline access node load distribution when the degree of difference is less than the difference threshold at the first deployment time.

13. The system of claim 9, wherein the processing node is further configured to receive from the plurality of access nodes an access node load distribution of the first radio access technology at the plurality of access nodes at a third time after the first deployment time, wherein the third time comprises a third deployment time of the second radio access technology to at least one of the plurality of access nodes.

14. The system of claim 13, wherein the processing node is further configured to determine a degree of difference between the access node load distribution at the third time and the baseline access node load distribution.

15. The system of claim 14, wherein the processing node is further configured to determine an access node load distribution of the second radio access technology based on the access node load distribution of the first radio access technology at the plurality of access nodes at the third time when the degree of difference is less than the difference threshold at the third deployment time.

16. The system of claim 9, wherein the processing node is further configured to:
 calculate a total load of the plurality of access nodes using the first radio access technology based on the received access node load distribution of the first radio access technology at the plurality of access nodes;
 calculate a first proportion of the total load of the plurality of access nodes using the first radio access technology at each of the plurality of access nodes where the second radio access technology is deployed;
 calculate second proportion of the total load of the plurality of access nodes using the first radio access technology at each of the plurality of access nodes where the second radio access technology is not deployed;
 determine the first access node load distribution of the first radio access technology at the plurality of access nodes where the second radio access technology is deployed based on the first proportion and an access node load distribution of the second radio access technology at each of the plurality of access nodes where the second radio access technology is deployed; and
 determine the second access node load distribution of the first radio access technology at the plurality of access nodes where the second radio access technology is not deployed based on the second proportion and an access node load distribution of the first radio access technology at the plurality of access nodes where the second radio access technology is not deployed.

\* \* \* \* \*